(12) United States Patent
Riley et al.

(10) Patent No.: US 7,789,161 B2
(45) Date of Patent: Sep. 7, 2010

(54) APPARATUS FOR INTERCONNECTING AND SEALING BETWEEN FIXED AND ROTATING CONDUITS AND METHODS OF INSTALLING SAME

(75) Inventors: Andrew Dale Riley, Eufaula, OK (US); Randall Ferrain Weaver, Haywood, OK (US)

(73) Assignee: National Oilwell Varco, L.P., Houston, TX (US)

(*) Notice: Subject to any disclaimer, the term of this patent is extended or adjusted under 35 U.S.C. 154(b) by 474 days.

(21) Appl. No.: 11/740,358

(22) Filed: Apr. 26, 2007

(65) Prior Publication Data

US 2007/0251703 A1    Nov. 1, 2007

Related U.S. Application Data

(60) Provisional application No. 60/795,601, filed on Apr. 27, 2006.

(51) Int. Cl.
*E21B 33/03*    (2006.01)
(52) U.S. Cl. .................. 166/379; 166/75.11; 277/323; 277/326; 277/327
(58) Field of Classification Search .............. 166/75.11, 166/84.1, 84.3, 84.4, 85.3, 86.2, 88.4, 237, 166/379; 175/207, 214; 277/322, 323, 326, 277/327, 532
See application file for complete search history.

(56) References Cited

U.S. PATENT DOCUMENTS

| | | | | |
|---|---|---|---|---|
| 2,185,822 A | * | 1/1940 | Young | 285/94 |
| 2,281,019 A | * | 4/1942 | Brauer | 285/61 |
| 2,394,800 A | * | 2/1946 | Murphy | 285/94 |
| 2,764,428 A | * | 9/1956 | Murphy | 277/503 |
| 3,058,761 A | * | 10/1962 | Christophersen | 285/281 |
| 3,743,325 A | * | 7/1973 | Schlarb | 285/94 |
| 3,752,507 A | * | 8/1973 | Maurer et al. | 285/12 |
| 4,157,186 A | | 6/1979 | Murray et al. | |
| 4,205,866 A | * | 6/1980 | McCracken | 285/281 |
| 4,381,868 A | * | 5/1983 | Croy et al. | 277/328 |
| 6,007,105 A | * | 12/1999 | Dietle et al. | 285/94 |
| 6,725,949 B2 | * | 4/2004 | Seneviratne | 175/85 |

(Continued)

FOREIGN PATENT DOCUMENTS

| | | |
|---|---|---|
| EP | 1469243 A1 | 10/2004 |
| GB | 647057 | 12/1950 |
| WO | 02101191 A2 | 12/2002 |
| WO | 02101191 A3 | 12/2002 |

*Primary Examiner*—David J Bagnell
*Assistant Examiner*—Blake Michener
(74) *Attorney, Agent, or Firm*—Conley Rose, P.C.

(57) ABSTRACT

A seal assembly, for sealing between a stationary conduit and a rotating conduit, comprises an upper gland assembly, a washpipe, and a lower gland assembly. The upper gland assembly is operable to engage the stationary conduit. A washpipe partially disposed within the upper gland assembly. An upper seal member is disposed within the upper gland assembly around a periphery of the washpipe. An upper packing ring is engaged with the upper gland assembly so as to compress the upper seal member into sealing engagement with the washpipe. A lower gland assembly is disposed about the washpipe and operable to engage the rotating conduit. A lower seal member is disposed within the lower gland assembly and is compressed into sealing engagement with the washpipe by a lower packing ring that is engaged with the lower gland assembly. The engagement of the packing rings with their respective gland assemblies is independent of the engagement of the gland assemblies and the conduits.

8 Claims, 10 Drawing Sheets

U.S. PATENT DOCUMENTS

| | | | |
|---|---|---|---|
| 6,923,254 B2 * | 8/2005 | Morrow et al. | 166/88.4 |
| 7,213,660 B2 * | 5/2007 | Martin | 175/207 |
| 2004/0035574 A1 * | 2/2004 | Pippert | 166/90.1 |
| 2004/0245727 A1 * | 12/2004 | Bunn | 277/500 |
| 2005/0242512 A1 | 11/2005 | Flindall | |
| 2006/0042789 A1 * | 3/2006 | Kubala | 166/88.4 |

* cited by examiner

APPARATUS FOR INTERCONNECTING AND SEALING BETWEEN FIXED AND ROTATING CONDUITS AND METHODS OF INSTALLING SAME

CROSS-REFERENCE TO RELATED APPLICATIONS

This application claims priority to U.S. Provisional Patent Application No. 60/795,601, filed Apr. 27, 2006, and titled "Apparatus for Interconnecting and Sealing Between Fixed and Rotating Conduits and Method of Installing Same," which is hereby incorporated by reference herein for all purposes.

STATEMENT REGARDING FEDERALLY SPONSORED RESEARCH OR DEVELOPMENT

Not Applicable.

BACKGROUND

The present invention relates generally to apparatus for providing high pressure fluid communication between generally aligned conduits that are rotatable relative to one another using pressure activated seals. In particular, but not exclusively, the disclosure relates to devices for sealing a wash pipe assembly between a fixed and rotating conduit as used in rotary drilling operations.

In applications requiring the transmission of fluid under relatively high pressure, it is sometimes necessary to interconnect a rotating conduit with a stationary conduit and to seal the connection therebetween. One such application is in drilling operations in which a fixed-to-rotating interface is located in apparatus that is supported from the derrick, and which may take the form of a swivel, a top drive unit, or similar device. The seal between the fixed and rotating parts typically includes pressure activated, elastomeric annular seals or packing rings that must be changed when seal wear or failure occurs. Seals in common use today typically must be replaced every few hundred hours of use. This replacement involves time consuming and sometimes dangerous procedures in which the replacement components and a worker are hoisted from the drill floor up to the equipment that houses the seals that are to be replaced. While suspended at a height that may be twenty to thirty feet or more above the drill floor, the worker typically utilizes a sledgehammer to hammer open certain unions allowing removal of the washpipe assembly that contains the seals. Thereafter, new seals are inserted into the assembly, and the assembly containing the new seals is hammered into place. Some conventional seal assemblies also require the use of a pressurized fluid in order to energize the pressure-activated seals once the assembly has been installed in the swivel or top drive. This again is accomplished while the worker dangles from support lines high above the drill floor. The change out of the washpipe and seal assembly is thus complicated and time consuming, and includes the danger of the worker dropping a heavy sledgehammer onto workers or equipment below.

One common washpipe assembly houses a plurality of redundant annular seals that, during replacement, are stacked in position in the seal gland housing while the worker is suspended above the drill floor. In other conventional assemblies, as mentioned above, the seals are pre-packed in a washpipe assembly before the assembly is hoisted to the swivel above the drill floor. However, in order for the assembly to be coupled into the conduits, the seals must be manipulated in order to energize the seals and cause them to sealingly engage the washpipe, or to allow coupling nuts to slide upon the washpipe assembly and engage the appropriate adjacent conduit. This may be accomplished by means of pressurized fluid as described, for example, in U.S. Patent Application Publication No. US2005/0242512, incorporated herein by reference. The pressurized fluid, such as air, may also be used to set or energize the seals. The use of pressurized fluid requires the worker to also carry or be provided a line for supplying the pressurized fluid. As will be understood, the complications associated with handling the washpipe assembly itself, in addition to pneumatic lines and a sledgehammer, make the operation awkward and time consuming to perform twenty or more feet above the drill floor. Further, given that drilling must cease during this replacement procedure and that drilling costs may be thousands of dollars per hour, it is desirable that the washpipe assembly be changed as quickly as possible, but with personnel safety a priority.

Accordingly, it would be an advance in the art if a more convenient and pre-energized or ready-to-install washpipe assembly was available so as to minimize certain safety concerns and speed up to the process of changing failed seals.

SUMMARY OF THE PREFERRED EMBODIMENTS

In one embodiment, a seal assembly, for sealing between a stationary conduit and a rotating conduit, comprises an upper gland assembly, a washpipe, and a lower gland assembly. The upper gland assembly is operable to engage the stationary conduit. A washpipe partially disposed within the upper gland assembly. An upper seal member is disposed within the upper gland assembly around a periphery of the washpipe. An upper packing ring is engaged with the upper gland assembly so as to compress the upper seal member into sealing engagement with the washpipe. A lower gland assembly is disposed about the washpipe and operable to engage the rotating conduit. A lower seal member is disposed within the lower gland assembly and is compressed into sealing engagement with the washpipe by a lower packing ring that is engaged with the lower gland assembly. The engagement of the packing rings with their respective gland assemblies is independent of the engagement of the gland assemblies and the conduits, thus allowing the seals to be engaged with the washpipe independently of the location of the seal assembly Embodiments of the present invention include a method for installing a washpipe assembly by first assembling a washpipe assembly on an assembly fixture so that both an upper and lower gland assembly are sealingly engaged with a washpipe. The washpipe assembly is then positioned in alignment with a stationary conduit and a rotatable conduit and coupled to both the stationary conduit and the rotatable conduit. The sealing engagement of the upper and lower gland assemblies with the washpipe is independent of the washpipe assembly being coupled to the stationary and rotatable conduits.

The present disclosure describes a combination of features aimed at overcoming various shortcomings of prior devices. The various characteristics described above, as sell as other features, will be readily apparent to those skilled in the art upon reading the following detailed description of the preferred embodiments, and by referring to the accompanying drawings.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

Disclosed is an apparatus for interconnecting a fixed or stationary conduit to a conduit intended to rotate relative to the fixed conduit, and for sealing between the fixed and rotating conduits to prevent pressurized fluid from escaping from the intended path through the aligned conduits. One particular application for the apparatus disclosed herein is as a washpipe assembly as used in the drilling of oil and gas wells. In particular, in such application, a stationary conduit that extends from a conventional gooseneck is aligned with, but spaced apart from, a conduit forming a part of a rotatable swivel assembly. Pressurized drilling fluid is conveyed through the gooseneck and stationary conduit and into the rotating conduit. The assembly disclosed herein interconnects the aligned conduits and allows drilling fluid to be conducted therethrough by maintaining a dynamic seal as one conduit rotates relative to the fixed conduit.

Figure 1:
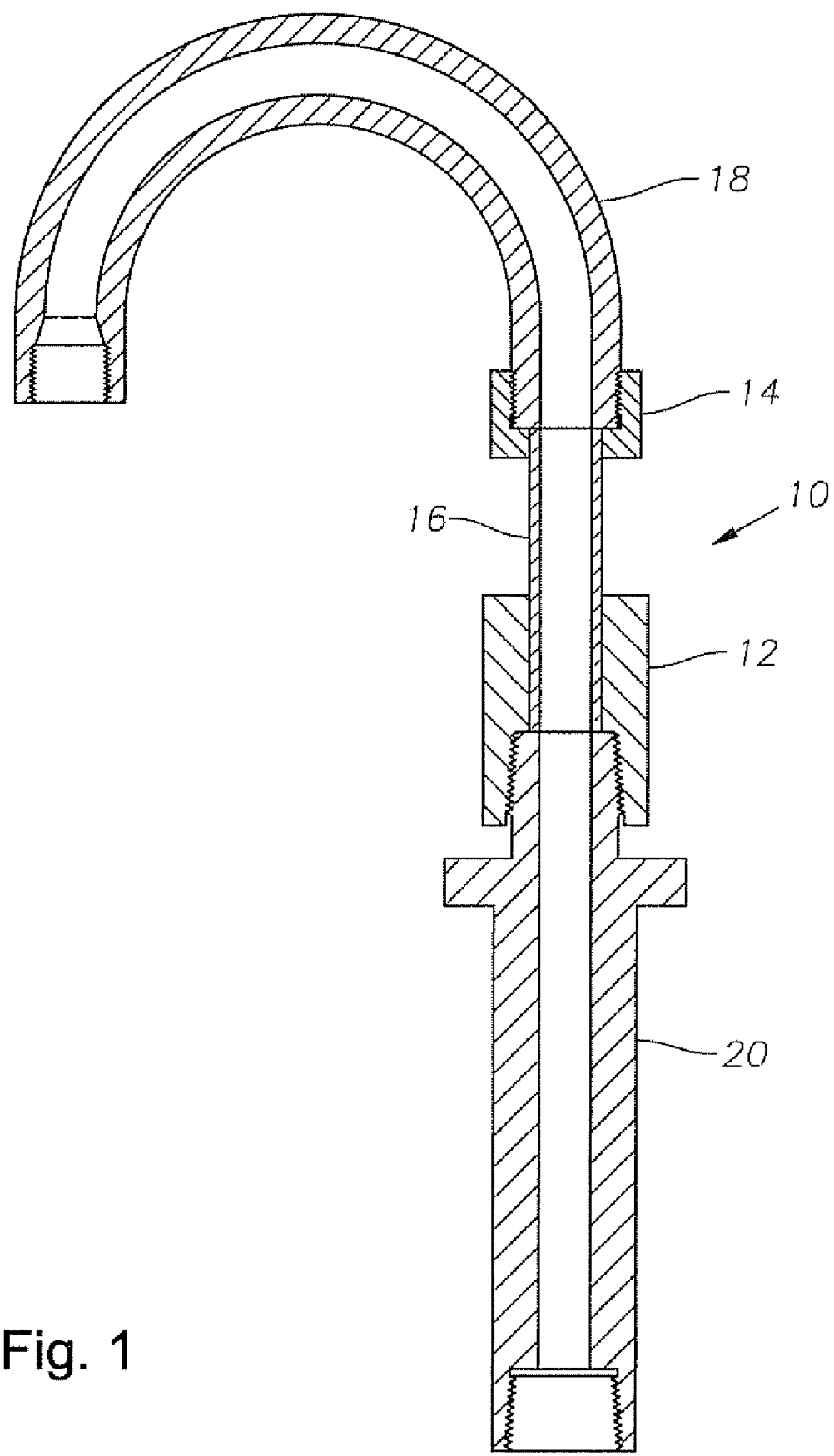
FIG. 1 is a cross-sectional view of a washpipe assembly disposed between a stationary and rotating conduit, portions thereof being shown in schematic form.

Referring to FIG. 1, a washpipe assembly 10 is shown disposed between a fixed conduit 18 and a conduit 20 that is adapted for rotation relative to fixed conduit 18. Washpipe assembly 10 generally includes lower gland assembly 12, upper gland assembly 14, and washpipe 16 that is disposed through apertures in the lower and upper gland assemblies 12, 14 and which is aligned with the fluid passageways in upper and lower conduits 18, 20. In general, the upper gland assembly 14 fixes the upper end of washpipe 16 to stationary conduit 18 and prevents fluid from escaping therebetween. Likewise, lower seal gland assembly 12 retains the lower end of washpipe 16 in alignment with rotating conduit 20 and is attached to conduit 20 such that lower gland assembly 12 rotates with rotating conduit 20. Lower gland assembly 12 includes dynamic seals (described below) which rotate about stationary washpipe 16 and prevent pressurized fluid from passing from the interior passageway of the washpipe.

Figure 2:
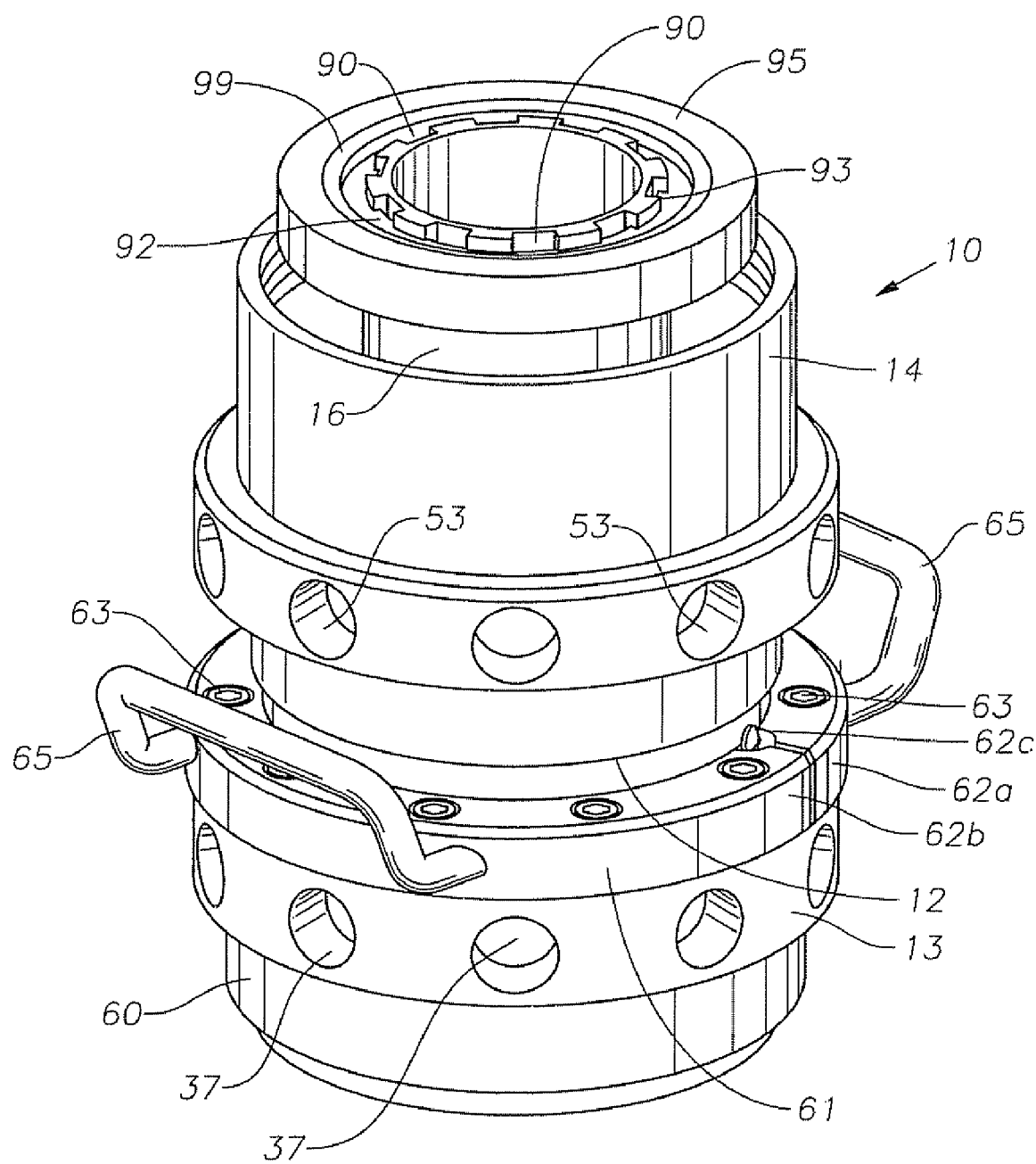
FIG. 2 is perspective view of one embodiment of a washpipe assembly constructed in accordance with embodiments of the current invention.
Figure 3:
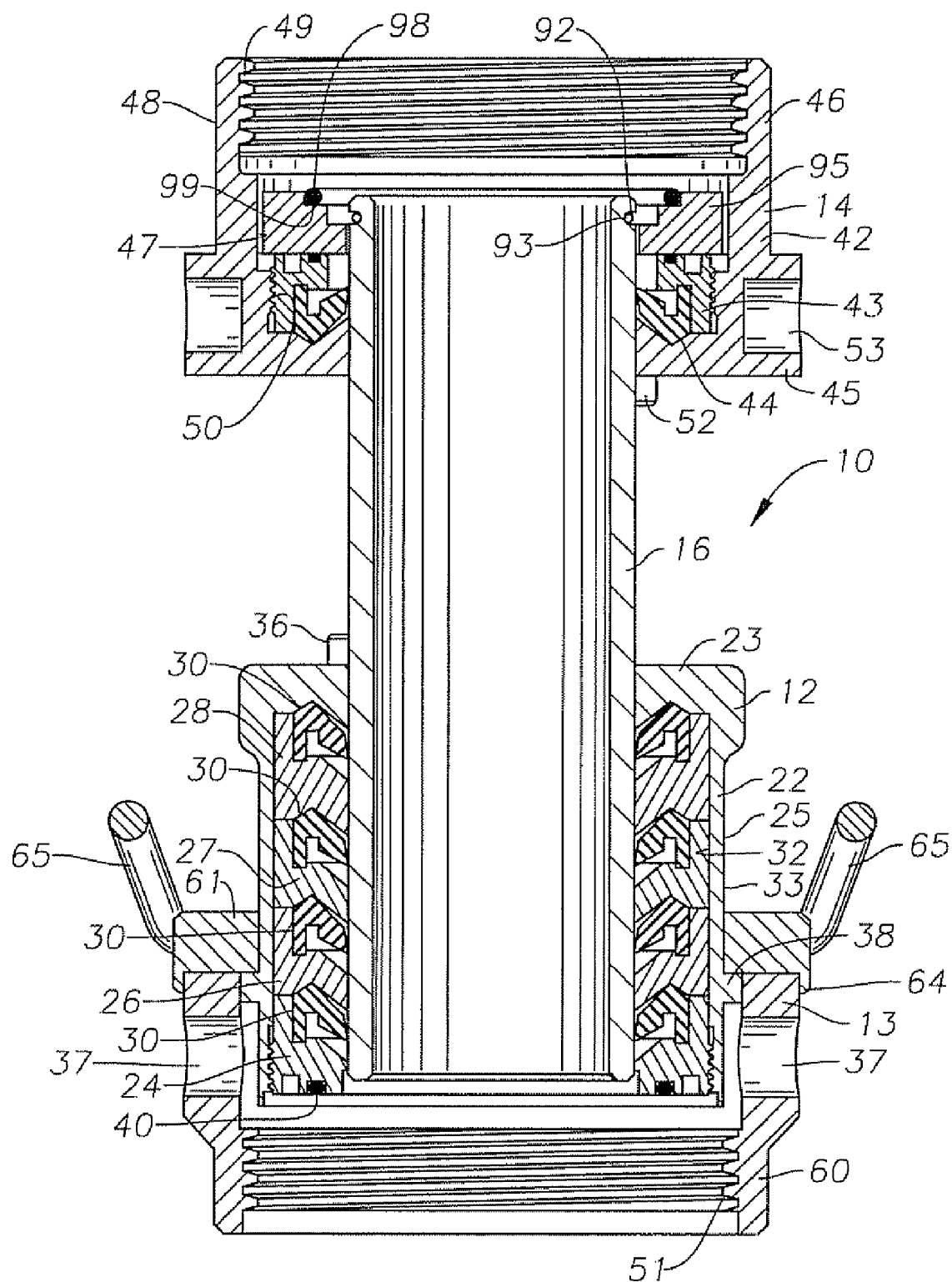
FIG. 3 is a longitudinal cross-sectional view of the washpipe assembly shown in FIG. 2.

The components of washpipe assembly 10 are best shown in FIGS. 2 and 3 and comprise lower gland assembly 12, lower gland nut 13, upper gland assembly 14, and washpipe 16. When assembled, upper gland assembly 14 is disposed about the upper end of washpipe 16 and lower gland assembly 12 is disposed about the lower end of the washpipe. Lower gland nut 13 provides threaded region 51 that is operable to connect to a correspondingly threaded region of rotating conduit 20 (see FIG. 1). Upper gland assembly 14 provides threaded region 49 that is operable to connect washpipe assembly 10 to rotating conduit 20 and stationary conduit 18, respectively.

Figure 4:
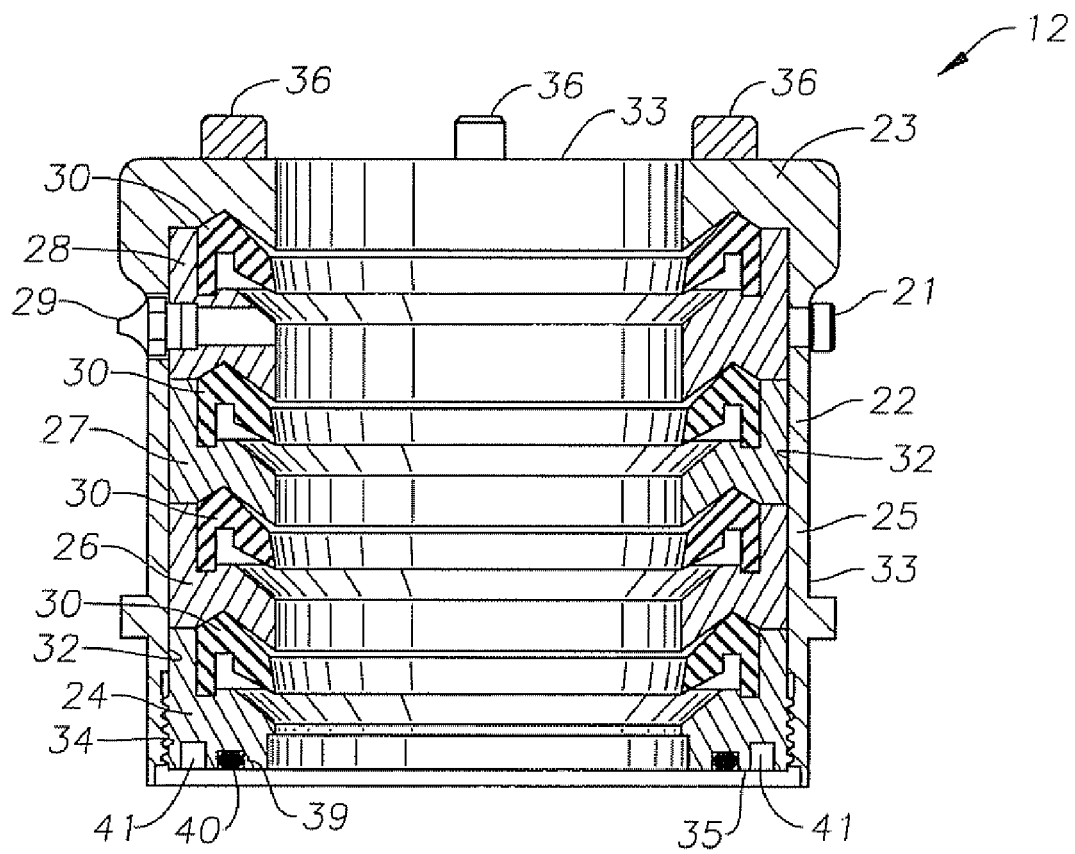
FIG. 4 is a cross-sectional view of the lower seal gland housing of the washpipe assembly shown in FIGS. 2 and 3.

As best shown in FIGS. 3 and 4, the lower gland assembly 12 includes a lower gland housing 22, threaded set ring 24, intermediate packing rings 26, 27, upper packing ring 28, and a series of annular resilient packing rings 30. Lower gland housing 22 includes a top or base portion 23 and a cylindrical sleeve-like portion 25 extending therefrom, and includes inner and outer surfaces 32, 33, respectively. The outer surface 33 of the top portion includes four extending lugs 36, as described in more detail below, and an annular, outwardly-extending flange 38.

As best shown in FIG. 4, the inner surface 32 of the lower housing 22 includes an internal threaded portion 34 for engaging corresponding threads formed on the radially-outer surface of threaded bottom packing ring 24. The lower facing surface 35 of threaded bottom packing ring 24 includes a groove or seal gland 39 for retaining annular O-ring seal 40, as well as six tool-engaging bores 41 described more fully below. Mounted in an aperture formed in sleeve portion 25 of the housing 22 is grease fitting 29 allowing for the introduction of grease within the seal assembly. Grease fitting 29 is installed through the housing and attached thereto to provide a means for lubricating between the washpipe and the seal surfaces. The grease fitting is a standard fitting having a check valve to allow grease to enter the assembly but restricting the outward flow of grease. Lower gland assembly 12 further includes a stop 21 that is intended to prevent damage to grease fitting 29 when lower gland nut 13 is raised when washpipe assembly 10 is lifted for installation. Upon assembly, upper packing ring 28, intermediate packing rings 26, 27, and bottom threaded packing ring 24 are positioned in the interior of the housing with annular resilient packing rings 30 disposed between each packing ring. Threaded bottom packing ring 24 is threaded onto interior threads 34 of the inner housing surface 32 to energize seals 30 and causing them to sealingly engage washpipe 16 once ring 24 is fully seated.

Figure 5:
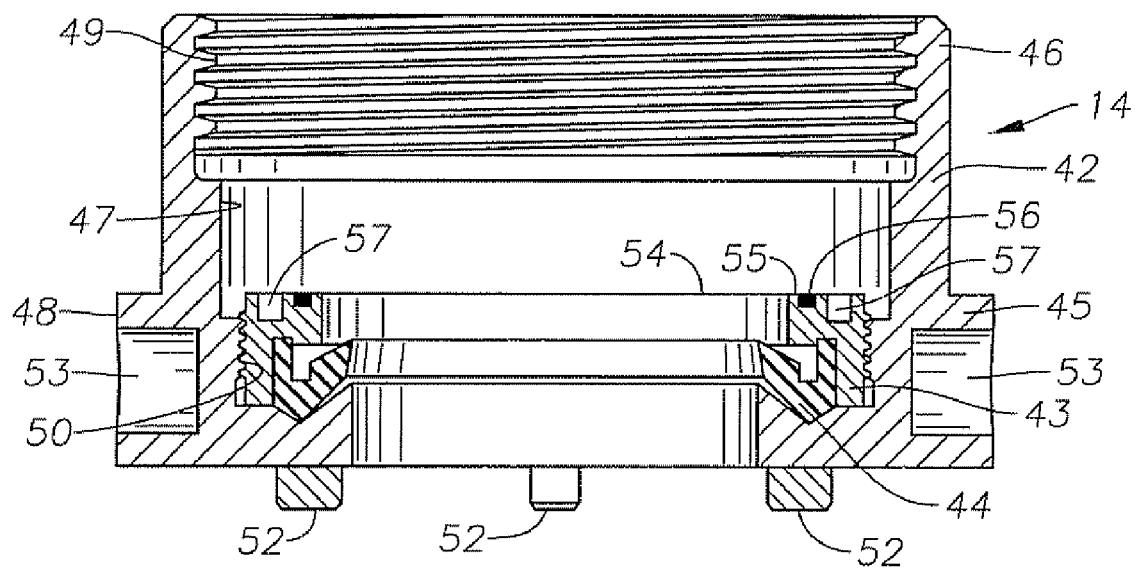
FIG. 5 is a cross-sectional view of the upper seal gland housing of the washpipe assembly shown in FIGS. 2 and 3.

Referring to FIGS. 3 and 5, the upper gland assembly 14 is shown to include upper gland housing 42, threaded upper packing ring 43, and annular resilient packing ring 44. Upper gland housing 42 includes a base portion 45 and a cylindrical portion 46 extending therefrom. The upper gland housing 42 includes inner and outer surfaces 47, 48, respectively. Formed on the uppermost end of the inner surface 47 is a threaded region 49 for engaging a correspondingly-threaded extension (not shown) of the stationary conduit 18. The inner surface 47 further includes a second threaded segment 50 adjacent to the base 45 for engaging a correspondingly threaded segment of the threaded upper packing ring 43 (also referred to herein as top or upper set ring 43). The outer surface 48 of base portion 45 includes four downwardly-extending lugs 52, and cylindrical portion 46 of housing 42 includes radial tool-engaging recesses 53 as will be described in more detail below.

Upon assembly, annular resilient packing ring 44 is disposed adjacent to the base portion 45 of the upper gland housing, and the threaded upper packing ring 43 is threaded onto threaded portion 50 of the housing. As best shown in FIG. 5, the facing surface 54 of the threaded upper packing ring 44 includes a seal gland or groove 55 which, in turn, houses an O-ring seal 56. Also included in facing surface 54 are six tool-engaging bores 57 described in more detail below. As best shown in FIG. 2, the upper end of washpipe 16 includes a plurality of milled grooves 90 extending longitudinally along the outside of the washpipe and spaced apart about the washpipe's circumference. Additionally, as shown in FIGS. 2 and 3, a circumferential groove 92 that intersects milled longitudinal grooves 90 is formed near the top of the washpipe for receiving a snap ring 93 as described more fully below.

As best shown in FIGS. 2 and 3, lower gland nut 13 includes an extending sleeve portion 60, and a collar portion 61. Collar portion 61 comprises two semicircular segments 62a, 62b that are connected to sleeve portion 60 by fastener 63 as shown in FIG. 2. The collar portions 62a, 62b include a downwardly-extending flange or lip 64 that engages the outer surface of sleeve 60. Each end of semicircular segments 62a, 62b includes a machined recess 62c to provide clearance for grease fitting 29 and for stop 21, as best shown in FIG. 2. Each semicircular collar portion 62a, 62b includes a handle or grasping member 65. In this arrangement, lower nut 13 may slide relative to housing 22 of lower gland assembly 12 until such time that the lower gland nut 13 threadedly connects the washpipe assembly 10 to rotating conduit 20. Formed in the sleeve portion 60 of the lower gland nut 13 is a plurality of radial tool-engaging recesses 37 for use during the installation of the assembly.

Figure 6:
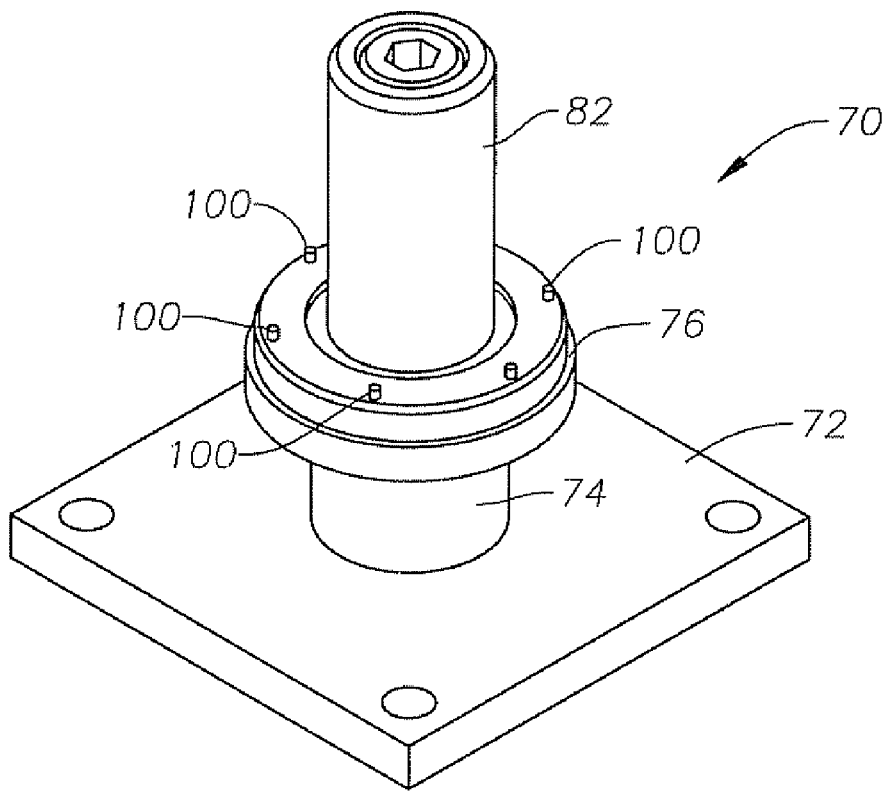
FIG. 6 is perspective view of a fixture employed in energizing the seals of the washpipe assembly shown in FIGS. 2-5.
Figure 7:
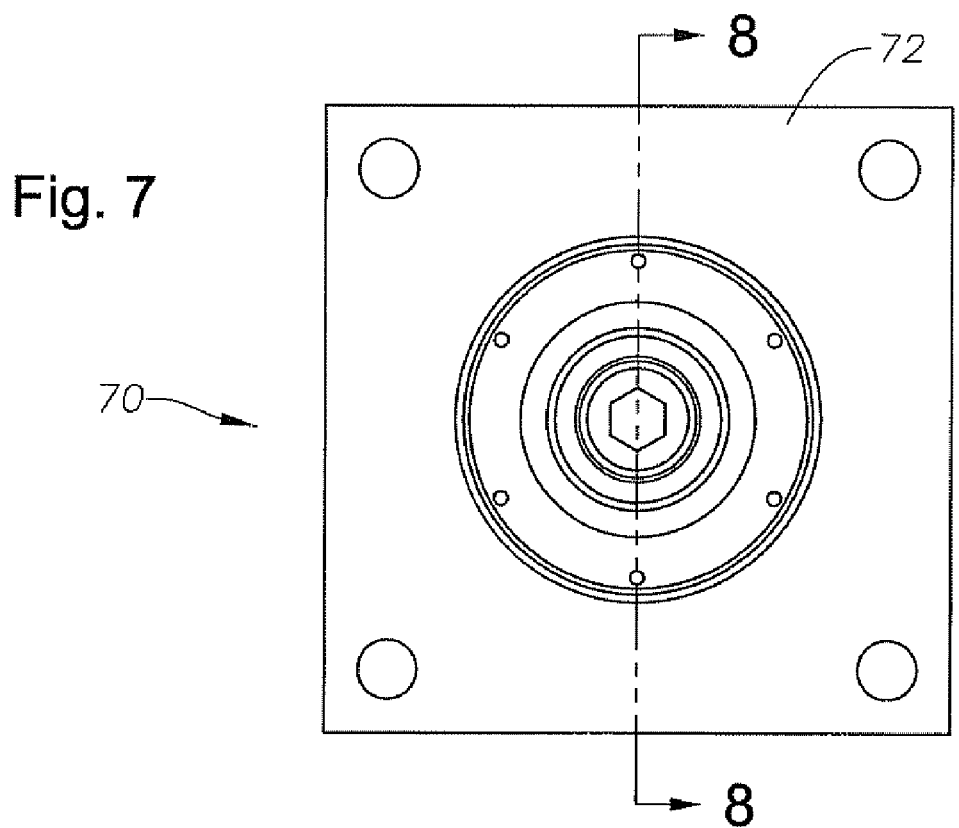
FIG. 7 is a top view of the fixture shown in FIG. 6.
Figure 8:
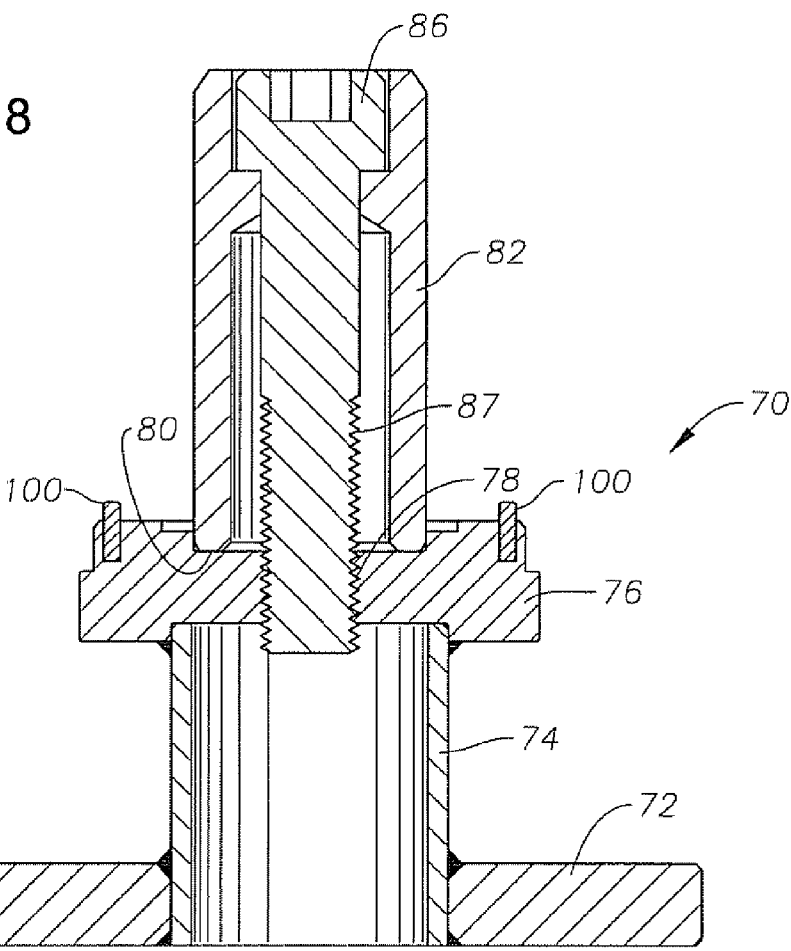
FIG. 8 is a cross-sectional view of the fixture shown in FIG. 7.

In order to energize the packing seals 30, 44 while the assembly is conveniently located on the rig floor, there is provided a compression fixture 70 best show in FIGS. 6-8. As shown, the fixture 70 includes a base plate 72 and a generally cylindrical support pedestal 74 extending upwardly therefrom. A mounting ring 76 is attached to the support pedestal and includes a central threaded bore 78 and a circular recess 80 for receiving a pilot sleeve 82. The pilot sleeve 82 seats in recess 80 and extends upwardly from the ring 76. Sleeve 82 is affixed to ring 76 by a central fastener 86, which includes a threaded portion 87 that engages threaded segment 78 of mounting ring 76. The pilot sleeve 82 has an outer diameter slightly less than the inside diameter of the washpipe 16.

The mounting ring 76 includes six upwardly extending locating pins 100 sized and spaced so as to be received within the tool-engaging bores 41 (FIG. 4) formed in lower threaded packing ring 24 of the lower gland assembly 12. As described in more detail below, the compression fixture 70 is provided and employed in order to energize the seals 30, 44 prior to lifting the washpipe assembly 10 from the rig floor, such that the assembly 10 is ready-to-install without additional steps having to be taken to energize the seals after the worker has been lifted above the rig floor.

Figure 11:
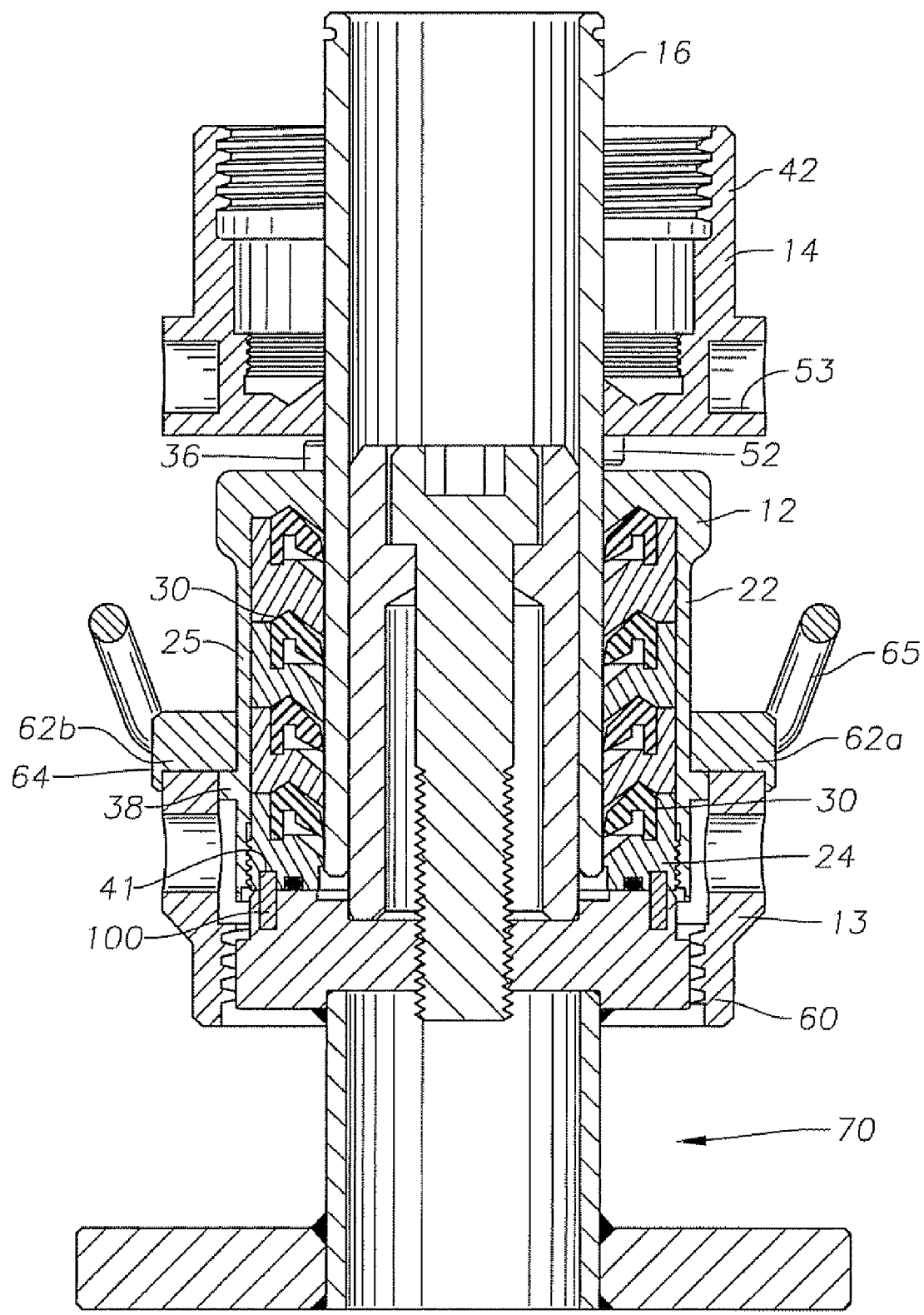
FIG. 11 is a cross-sectional view of the washpipe assembly of FIGS. 2 and 3 in a first stage of assembly.
Figure 12:
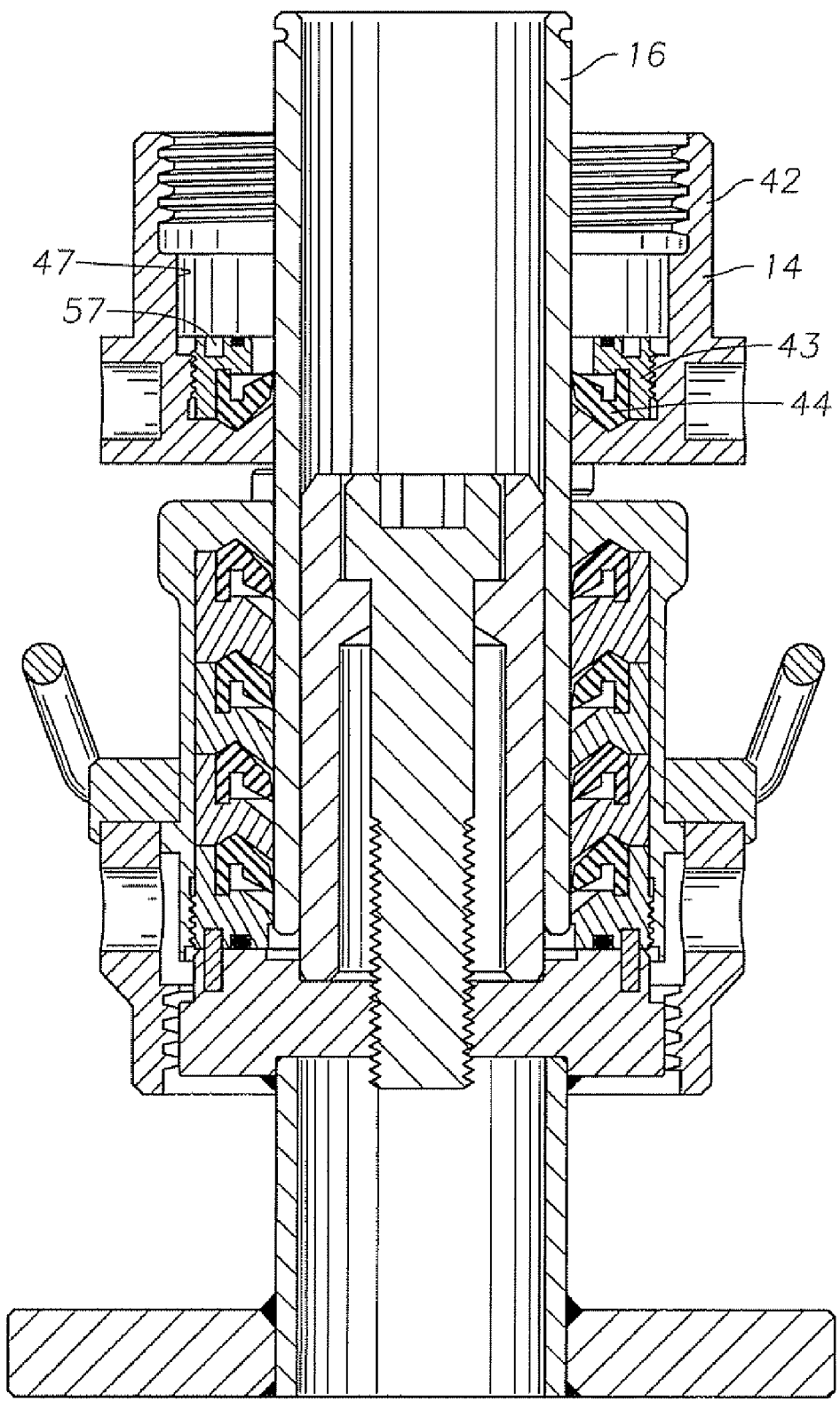
FIG. 12 is a cross-sectional view of the washpipe assembly of FIGS. 2 and 3 in a second stage of assembly.
Figure 13:
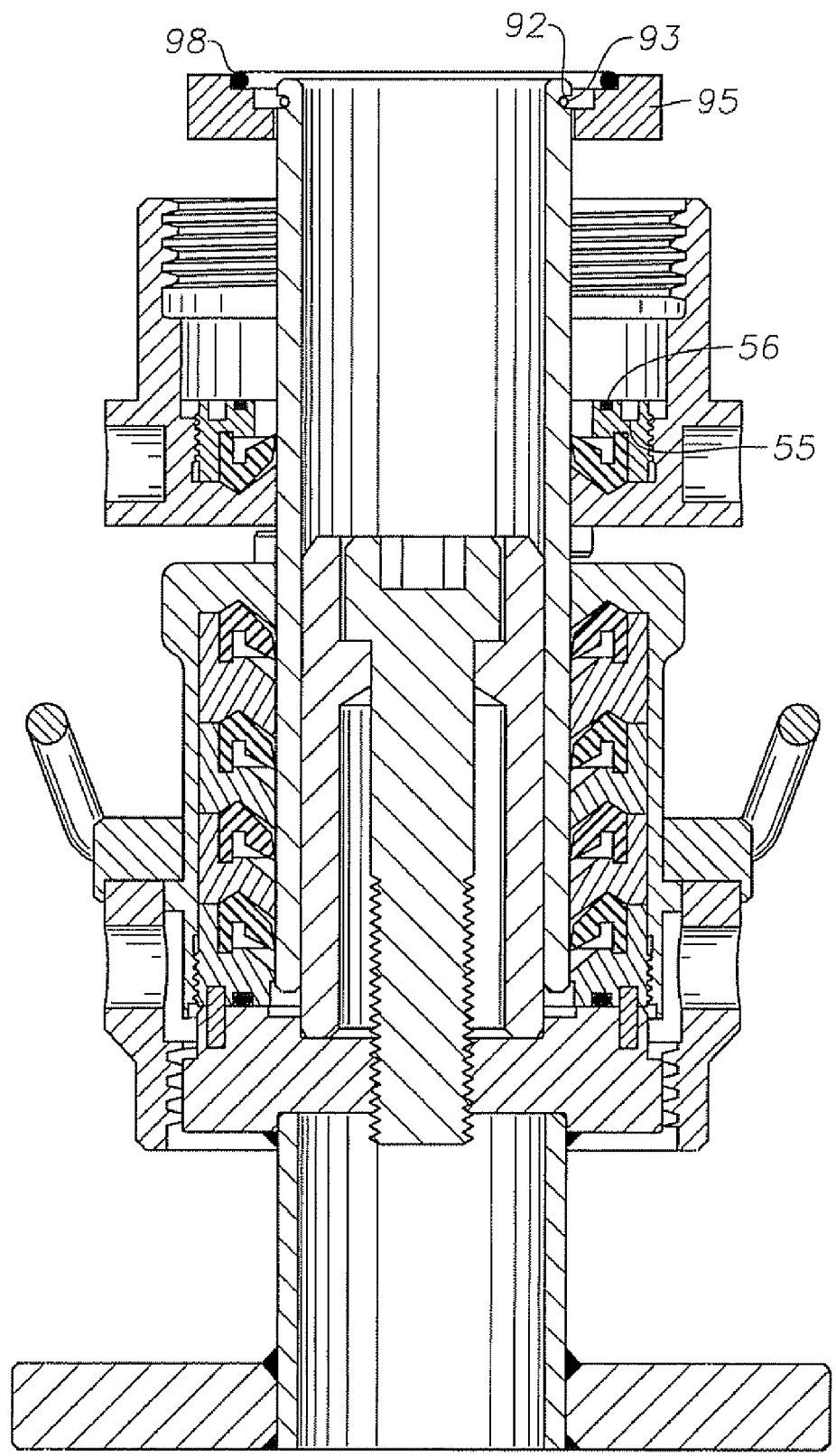
FIG. 13 is a cross-sectional view of the washpipe assembly of FIGS. 2 and 3 in a third stage of assembly.

The assembly of the washpipe assembly is shown in FIGS. 11-13. Referring to FIG. 11, sleeve portion 25 of lower gland housing 22 is disposed through the central bore of the bottom gland nut 13. Semicircular collar portions 62a, 62b are then attached to the upper surface of the gland nut sleeve 60 via fasteners 63 (see FIG. 2). The downwardly extending lip 64 formed on the lower surface of the collar portions extends over and captures the annular flange 38 extending from the outer surface of the lower gland housing 22. Handles or grips 65 extend from the collar portions. In this position, gland nut 13 may slide relative to lower gland housing 22 to the limits permitted by the intersection of collar portions 62a, 62b with annular flanges 38.

Prior to installation on fixture 70 (as shown in FIG. 11) lower gland housing 12 is inverted and positioned such that the lugs 36 rest against a work surface and the opening that retains the packing seals and rings is upwardly disposed. The uppermost packing ring 30 is then placed in the housing in the position shown in FIG. 4 such that its V-shaped annular extension is received by and mates with the correspondingly V-shaped annular recess formed in the inner surface 32 of the housing at base 23. The upper packing ring 28 is next installed. In turn, the intermediate packing seals 30 and intermediate packing rings 26, 27 are sequentially stacked within the housing as shown in FIG. 4. Finally, the lowermost packing seal 30 and lower threaded packing ring 24 are installed. The lower threaded packing ring 24 is threaded by hand into engagement with the threaded portion 34 of the housing. At this stage of the assembly, ring 24 is not fully seated and, consequently, packing rings 30 are not yet set or energized.

Lower seal gland housing 22 is next inverted again such that lugs 36 face upward and washpipe 16 is then positioned within the central bore of lower seal gland housing 22 so that milled slots 90 (see FIG. 2) are at the top, and extend outwardly from the lower gland housing 22. At this step of the assembly procedure, the lower gland housing 22 is placed on the compression fixture 70 such that the locating pins 100 on the fixture 70 mate with the bores 41 formed in the lower set ring 24, as is shown in FIG. 11. The packing seals 30, at this step, have not been energized such that the washpipe 16 may slide through the opening in the lower gland housing 22 without difficulty. Top gland housing 42 is then disposed over the top of the washpipe 16.

Figure 10:
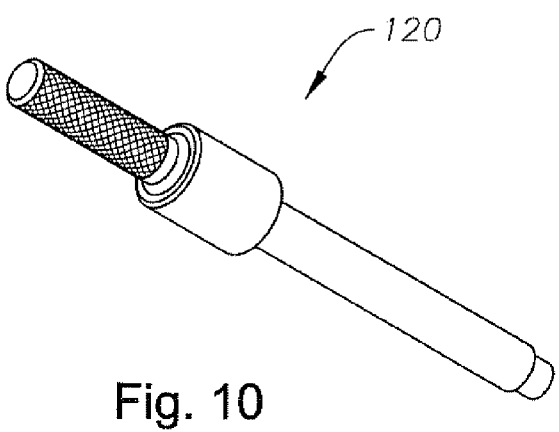
FIG. 10 is a perspective view of a torque-imparting bumper bar.

In this position, the downwardly extending lugs 52 of the top seal gland housing are oriented to engage with the corresponding upwardly extending lugs 36 from the lower gland assembly 12 such that rotation of the upper gland housing 42 will rotate the lower gland housing 22 via engagement of lugs 52 and 36. The upper housing 42 is then rotated by use of bumper bar 120 (see FIG. 10) which, in turn, causes the lower housing 22 to rotate. Because set ring 24 is fixed into the compression fixture 70, the lower housing 22 is rotated relative to the stationary set ring 24 causing the ring to be tightened within the housing and causing the ring 24 to set, or energize, the resilient packings 30 against the outer diameter of washpipe 16.

Figure 9:
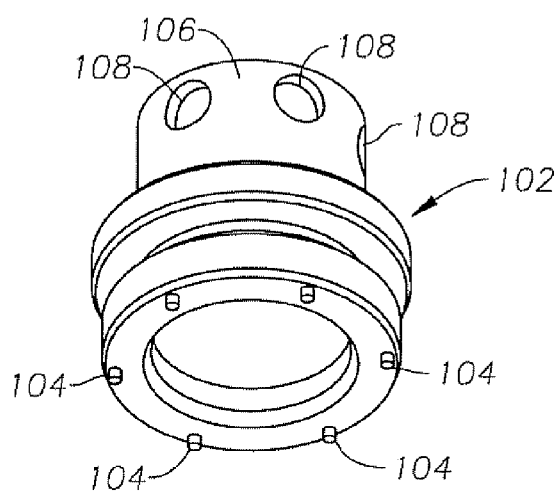
FIG. 9 is a perspective view of an assembly tool.

Referring now to FIG. 12, upper set ring 43 and upper packing seal 44 are disposed within upper housing 42. Tool-receiving bores 57 of upper set ring 43 are upwardly-disposed. Rotation of the upper set ring 43 is accomplished by use of an assembly tool 102, such as is shown in FIG. 9. The tool 102 includes six extending lugs 104 sized and positioned so as to correspond to the tool-receiving bores 57 in the upper set ring 43. The assembly tool further includes a cylindrical extension 106 having radially-positioned tool-receiving bores 108. To set the top ring 43 and energize the upper packing seal 44, the assembly tool 102 is disposed in the interior of the upper gland housing 42 such that the lugs 104 mate with the tool-receiving bores 57 in the set ring 43. Using the bumper bar 120 (FIG. 10) or another tool, the assembly tool 102 is rotated causing the set ring 43 to fully thread and bottom out against the inner surface 47 of the gland housing, thereby energizing seal 44. The assembly tool 102 is the removed.

Referring now to FIG. 13, O-ring seal 56 is disposed in the seal groove 55 and the lug collar 95 is next installed. Lug collar 95 includes a slotted inner surface enabling its surface to mate with the longitudinal slots 90 of the washpipe end. The lug collar 95 is positioned below the snap ring groove 92 and the snap ring 93 is then installed in circumferential groove 92 to retain the lug collar 95 on the washpipe. At this point, the washpipe assembly 10 is ready to be installed with all pressure-activated packing seals energized. Referring back to FIG. 2, prior to installation, O-ring 40 is installed in seal groove 39 in the facing surface 35 of lower threaded packing ring 24, and upper annular O-ring seal 98 is positioned in seal groove 99 formed in the upper surface of lug collar 95.

Figure 14:
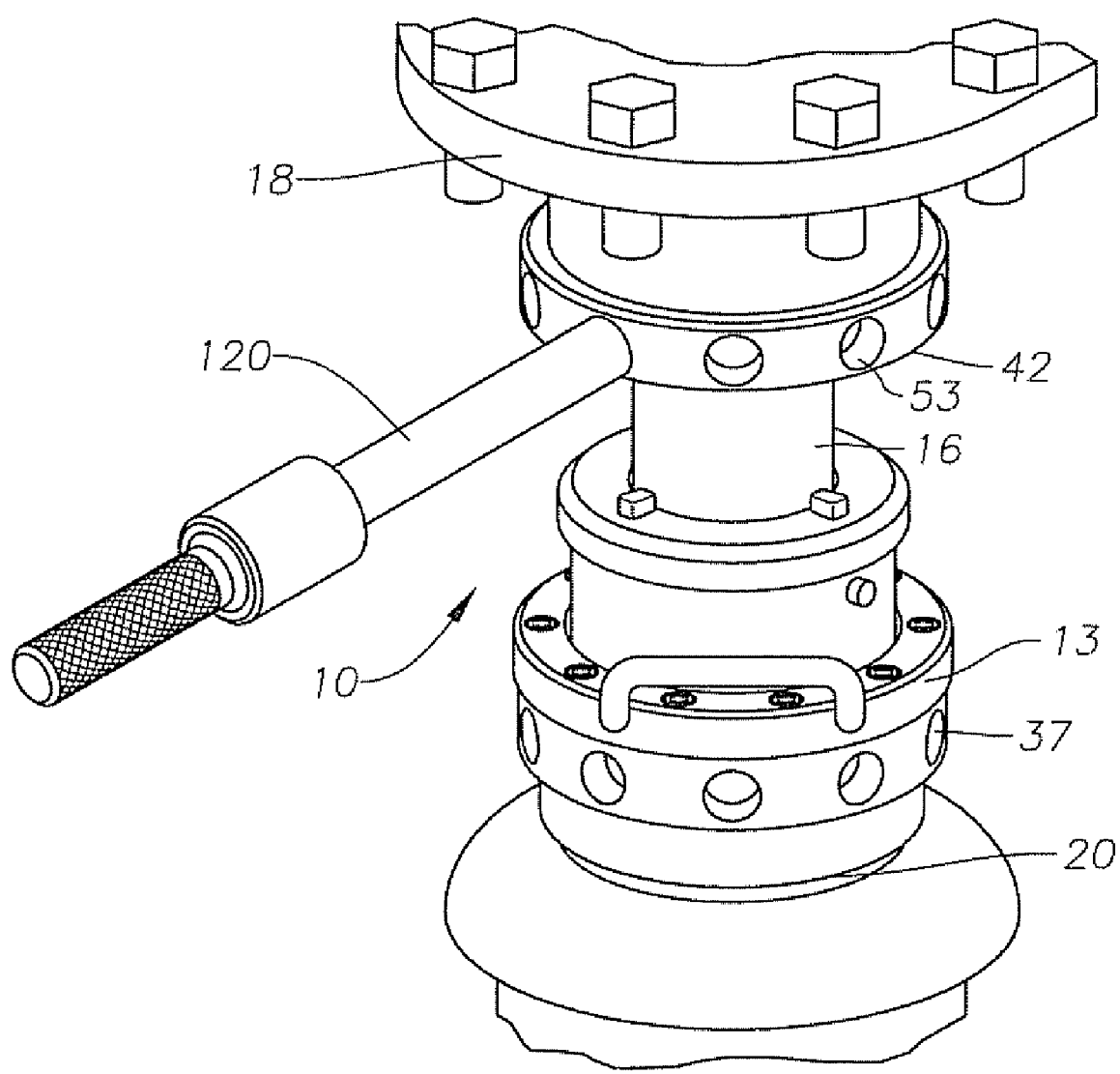
FIG. 14 is a perspective view of the washpipe assembly of FIGS. 2 and 3 positioned within a swivel housing.

Referring now to FIG. 14, when it is necessary to change out the washpipe assembly, rig personnel are hoisted up to the swivel or top drive in order to remove the previously-installed washpipe assembly 10. After that assembly has been removed, the stand-by and ready-to-install washpipe assembly 10 is lifted into position. The washpipe assembly 10 is then positioned between the stationary conduit 18 of the gooseneck and the rotating conduit 20 in the swivel. Because the rotary seals have previously been energized, no special pressurizing need be performed by the worker while suspended above the rig floor and thus no pneumatic or hydraulic lines need be carried or manipulated. Instead, installation is accomplished by first hand-threading the top gland housing 42 onto the threaded portion of the downwardly-extending conduit 18 and hand-threading the bottom gland nut 13 onto the upwardly-extending threaded conduit 20 of the swivel assembly. After hand tightening these components, the worker inserts the reduced diameter end portion of bumper bar 120 into the radial tool-engaging recesses 53, 37 formed in the upper gland housing and lower nut 13, respectively, and completes tightening the nuts by manipulating the bumper bar as shown in FIG. 11. Should the worker lose his grip on the tool, a connected tether prevents the tool from falling to the rig floor. Upon completion of the installation, drilling operations can commence again.

While preferred embodiments have been shown and described, modifications thereof can be made by one skilled in the art without departing from the spirit or teaching herein. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A seal assembly, comprising:
   a conduit, including a fluid passageway and an outer surface;
   a seal housing disposed about and adapted for rotation relative to said conduit;
   an annular, energizable seal disposed about said conduit and retained in said housing, said housing including an inner surface having a threaded segment;
   a ring member having a threaded surface adapted for engagement with said threaded segment of said housing and a facing surface having a plurality of tool-engaging recesses; and
   a coupling nut slideably disposed about said housing;
   wherein rotation of one of said housing or said ring member relative to the other causes said ring member to energize said annular seal such that said annular seal sealingly engages the outer surface of said conduit; and
   wherein said facing surface faces in a first axial direction, and wherein said housing includes an outer surface having a plurality of lugs extending in a direction opposite said first axial direction.

2. The seal assembly of claim 1, wherein said coupling nut is adapted for rotation relative to said housing and includes a plurality of spaced-apart and radially-oriented tool-engaging recesses.

3. The seal assembly of claim 1, wherein said conduit includes a first end and a second end, wherein the sealing housing, the annular seal, and the ring member are disposed at the first end of said conduit and wherein the seal assembly further comprises another seal housing, another annular seal, and another ring member with a threaded surface at the second end of said conduit.

4. A method for installing a washpipe assembly, comprising:
   assembling a washpipe assembly on an assembly fixture so that both an upper and lower gland assembly are sealingly engaged with a washpipe;
   positioning the washpipe assembly in alignment with a stationary conduit and a rotatable conduit; and
   coupling the washpipe assembly to both the stationary conduit and the rotatable conduit, wherein the sealing engagement of the upper and lower gland assemblies with the washpipe is independent of the washpipe assembly being coupled to the stationary and rotatable conduits;
   wherein assembling the washpipe assembly comprises:
      disposing a lower packing ring and a lower seal member within a lower gland assembly;
      disposing the lower gland assembly onto an assembly fixture so that the lower packing ring is rotationally constrained by the assembly fixture;
      disposing a washpipe partially within the lower gland assembly; and
      rotating the lower gland assembly relative to the lower gland assembly so that the lower packing ring compresses the lower seal member into sealing engagement with the washpipe, wherein the lower gland assembly is rotated by disposing an upper gland assembly about the washpipe so as to engage the lower gland assembly such that rotation of the upper gland assembly causes rotation of the lower gland assembly.

5. A seal assembly comprising:
   an upper gland assembly operable to engage a stationary conduit;
   a washpipe partially disposed within said upper gland assembly;
   an upper seal member disposed within said upper gland assembly around a periphery of said washpipe;
   an upper packing ring engaged with said upper gland assembly so as to compress said upper seal member into sealing engagement with said washpipe, wherein the engagement of said upper packing ring with said upper gland assembly is independent of the engagement of said upper gland assembly and the stationary conduit;
   a lower gland assembly disposed about said washpipe and operable to engage a rotating conduit;
   a lower seal member disposed within said lower gland assembly around a periphery of said washpipe; and
   a lower packing ring engaged with said lower gland assembly so as to compress said lower seal member into sealing engagement with said washpipe, wherein the engagement of said lower packing ring with said lower gland assembly is independent of the engagement of said lower gland assembly and the rotating conduit;
   wherein said upper gland assembly comprises downwardly-extending lugs that are operable to engage upwardly-extending lugs disposed on said lower gland assembly when said upper gland assembly is disposed adjacent to said lower gland assembly.

6. A method for installing a washpipe assembly, comprising:
- assembling a washpipe assembly on an assembly fixture so that both an upper and lower gland assembly are engaged with a washpipe;
- energizing seals within the upper gland assembly and the lower gland assembly into sealing engagement with the washpipe;
- after energizing said seals, positioning the washpipe assembly in alignment with a stationary conduit and a rotatable conduit; and
- coupling the washpipe assembly to both the stationary conduit and the rotatable conduit;
- wherein engaging the lower gland assembly with the upper gland assembly comprises:
  - engaging a plurality of axially extending lugs extending from the upper gland assembly between a plurality of axially extending lugs extending from the lower gland housing; and
- wherein assembling the washpipe assembly comprises:
  - disposing a lower packing ring and a lower seal member within a lower and assembly;
  - disposing the lower gland assembly onto the assembly fixture so that the lower packing ring is rotationally constrained by the assembly fixture;
  - disposing a washpipe partially within the lower gland assembly; and
  - rotating the lower gland assembly relative to the lower packing ring so that the lower packing ring compresses the lower seal member into sealing engagement with the washpipe.

7. The method of claim 6, wherein assembling the washpipe assembly further comprises:
- disposing an upper packing ring and an upper seal member within an upper gland assembly;
- disposing the upper gland assembly onto the washpipe; and
- rotating the upper packing ring relative to the upper gland assembly so that the upper packing ring compresses the upper seal member into sealing engagement with the washpipe.

8. The method of claim 6, wherein the washpipe assembly is coupled to the stationary conduit and the rotatable conduit through threaded connections that are engaged by rotating the upper and lower gland assemblies relative to the conduits, wherein the upper and lower gland assemblies each comprise a plurality of spaced-apart and radially-oriented tool-engaging recesses that provide locations for the engagement of a tool used to apply torque to the upper and lower gland assemblies.

* * * * *